United States Patent
Ding et al.

(10) Patent No.: US 10,101,218 B2
(45) Date of Patent: Oct. 16, 2018

(54) THERMAL SENSOR

(71) Applicant: Kidde Technologies, Inc., Wilson, NC (US)

(72) Inventors: Zhongfen Ding, South Windsor, CT (US); Jonathan Rheaume, West Hartford, CT (US); Mark R. Jaworowski, Glastonbury, CT (US); Georgios S. Zafiris, Glastonbury, CT (US); Joseph J. Sangiovanni, West Suffield, CT (US); Theresa Hugener-Campbell, Coventry, CT (US)

(73) Assignee: Kidde Technologies, Inc., Wilson, NC (US)

( * ) Notice: Subject to any disclaimer, the term of this patent is extended or adjusted under 35 U.S.C. 154(b) by 606 days.

(21) Appl. No.: 14/308,108

(22) Filed: Jun. 18, 2014

(65) Prior Publication Data
US 2015/0369672 A1 Dec. 24, 2015

(51) Int. Cl.
*G01K 7/00* (2006.01)
*H01H 35/00* (2006.01)
*G01K 7/16* (2006.01)
*G01K 3/00* (2006.01)
*G01K 11/06* (2006.01)
*C23C 2/04* (2006.01)
*G01K 13/00* (2006.01)

(52) U.S. Cl.
CPC .......... *G01K 7/16* (2013.01); *C23C 2/04* (2013.01); *G01K 3/005* (2013.01); *G01K 11/06* (2013.01); *G01K 13/00* (2013.01)

(58) Field of Classification Search
CPC ...... G01K 11/06; G01K 3/005; H01H 37/761; H01H 85/143; H01H 35/00
USPC ......... 374/102–106, 160, 16, 163, 185, 184, 374/101; 116/216; 337/298
See application file for complete search history.

(56) References Cited

U.S. PATENT DOCUMENTS

| | | | | |
|---|---|---|---|---|
| 2,487,526 A | * | 11/1949 | Dahm | H01H 37/76 338/271 |
| 2,750,482 A | * | 6/1956 | Peterson | G08B 17/06 338/214 |
| 3,089,239 A | * | 5/1963 | Loda | A45D 29/02 30/142 |

(Continued)

FOREIGN PATENT DOCUMENTS

| | | | | |
|---|---|---|---|---|
| DE | 19852115 A1 | * | 5/2000 | ........... H01H 85/055 |
| GB | 2156154 A | * | 10/1985 | ............ G08B 17/06 |

(Continued)

OTHER PUBLICATIONS

WO2008006250 A1 Bib Data, Jan. 17, 2008.*
(Continued)

*Primary Examiner* — Gail Kaplan Verbitsky
(74) *Attorney, Agent, or Firm* — Locke Lord LLP; Daniel J. Fiorello; Scott D. Wofsy

(57) ABSTRACT

A thermal/overheat sensor for an aircraft includes an outer electrode, an inner electrode, a support layer disposed between the outer electrode and the inner electrode. The support layer contains a state changing material wherein the state changing material is configured to transition between a non-conductive state to a conductive state at a threshold temperature to electrically connect the outer and inner electrodes.

11 Claims, 1 Drawing Sheet

(56) References Cited

U.S. PATENT DOCUMENTS

| | | | | |
|---|---|---|---|---|
| 3,521,131 A * | 7/1970 | Buzzelli | | H03K 17/00 174/1 |
| 3,594,657 A * | 7/1971 | Cook | | H03K 3/313 257/664 |
| 3,743,993 A * | 7/1973 | Alley | | G01K 5/00 337/114 |
| 4,023,412 A * | 5/1977 | Luke | | F17C 13/126 324/534 |
| 4,361,799 A * | 11/1982 | Lutz | | G01K 3/00 219/505 |
| 4,372,693 A * | 2/1983 | Lutz | | G08B 17/06 324/519 |
| 4,400,680 A * | 8/1983 | Heline, Jr. | | H01H 37/767 337/415 |
| 4,687,903 A * | 8/1987 | Zimmerman | | B23K 3/0353 219/229 |
| 4,712,096 A * | 12/1987 | Cholin | | G02B 6/4206 340/590 |
| 4,744,671 A * | 5/1988 | Bowen | | G01K 11/06 116/217 |
| 5,294,909 A * | 3/1994 | Frazier | | G01M 3/045 338/214 |
| 5,412,374 A * | 5/1995 | Clinton | | G08B 17/06 340/584 |
| 5,726,851 A * | 3/1998 | Knapp | | H01H 85/041 337/159 |
| 7,377,690 B1 * | 5/2008 | Diede | | F42B 39/14 102/364 |
| 7,671,717 B2 * | 3/2010 | Zhang | | G08B 17/06 169/60 |
| 7,857,996 B2 * | 12/2010 | Gordon | | G01K 3/005 210/634 |
| 9,267,853 B2 * | 2/2016 | Fernandes | | G01J 5/046 |
| 9,461,337 B2 * | 10/2016 | Manning | | H01M 10/4235 |
| 9,518,872 B2 * | 12/2016 | Rogers | | G01K 7/16 |
| 2002/0140527 A1 * | 10/2002 | Shamsaifar | | H01P 1/207 333/202 |
| 2004/0062294 A1 * | 4/2004 | Clemens | | G01D 5/14 374/185 |
| 2004/0140421 A1 * | 7/2004 | Dammann | | B64D 45/00 250/227.14 |
| 2008/0008226 A1 * | 1/2008 | Zhang | | G01K 3/005 374/178 |
| 2008/0106365 A1 * | 5/2008 | Li | | A62C 3/00 337/401 |
| 2011/0300664 A1 * | 12/2011 | Chung | | H01L 31/02013 438/80 |

FOREIGN PATENT DOCUMENTS

| | | | |
|---|---|---|---|
| JP | 55946893 B2 * | 11/1984 | |
| JP | 10335119 A * | 12/1998 | |
| WO | WO 2008006250 A1 * | 1/2008 | G01K 3/005 |
| WO | WO2008006250 A1 * | 1/2008 | |

OTHER PUBLICATIONS

WO2008006250 A1 Drawungs, Jan. 17, 2008.*
WO2008006250 A1 Claims, Jan. 17, 2008.*
WO2008006250 A1 Description, Jan. 17, 2008.*

* cited by examiner

THERMAL SENSOR

BACKGROUND

1. Field

The present disclosure relates to thermal sensors, more particularly to continuous thermal/overheat sensing in aircraft and vehicles.

2. Description of Related Art

Thermal sensing in aircraft components (e.g., a hot air duct from an engine for cabin environmental control) can utilize heat sensing elements disposed therein for monitoring the components for overheating. Current duct leak overheat detection systems (DLODS) use a nickel-containing inner core electrode and an Inconel 625 outer sheath electrode separated by a granular, porous ceramic or glass layer. This granular, support layer is filled with a salt and acts as an electrical barrier between electrodes when exposed below a threshold temperature. The salt mixture melts at a threshold temperature and causes electrical connection between the inner electrode and the outer electrode such that the salt mixture is a heat-sensing component.

Such conventional methods and systems have generally been considered satisfactory for their intended purpose. However, there is still a need in the art for improved thermal sensors. For aircraft with polymer composite components, the overheat sensing needs to react at lower temperature with faster and accurate response. The present disclosure provides a solution for this need.

SUMMARY

In at least one aspect of this disclosure, a thermal sensor for an aircraft includes an outer electrode, an inner electrode, a support layer disposed between the outer electrode and the inner electrode. The support layer contains a state changing material wherein the state changing material is configured to transition between a non-conductive state to a conductive state at a threshold temperature to electrically connect the outer and inner electrodes. The support layer could be an independent entity or a part of an electrode. For example, two electrodes can include stainless steel, aluminum, and/or other conducting material. The support layer can be an anodized layer on at least one interior surface of one electrode.

The state changing material is deposited so that the state changing material is in partial contact with the anodized and non-anodized electrode surface. In some embodiments, upon reaching the critical sensor temperature, the state changing material converts from a solid to a liquid and completes an electrical connection which results in a sensor output.

In some embodiments, the support layer could include a granular ceramic, glass or a granular high temperature polymer. The form of the granular ceramic or polymer may exist as a mesh, fibers, or membrane structure. A suitable polymeric material includes high temperature polytetrafluoroethylene (PTFE), and suitable ceramic materials include non-conducting metal oxides such as alumina, and glass. The high temperature polymer can include at least one of polytetrafluoroethylene (PTFE), polyetheretherketone (PEEK), polyetherimide (PEI), polyphenylsulfone (PPSU), or polysulfone (PSU).

The state changing material can include a eutectic salt, a salt mixture, a conducting polymer film, and/or any other suitable phase/state changing material. The salt can include, for example, any suitable chemical mixture of nitrate salts having lithium, sodium and potassium cations and a lesser amount of nitrite salt that may contain one or more cations that include lithium, sodium and potassium. The desired amount of nitrite species ranges from about 1% by weight to about 15% by weight. An example salt includes a ratio: $LiNO_3:NaNO_3:KNO_3:NaNO_2$. Salts can include suitable compositions, e.g., $CsNO_3.Ca(NO_3)_2$, $NaCl$, $ZnSO_4$, $KI$, $SnCL_2$, $NH_4Cl$, and/or $MgCl$. The state changing material can be sandwiched between the outer electrode and the inner electrode and can be sealed in between the outer electrode and the inner electrode by a sealant. The sealant includes a perfluoro-elastomer or any other suitable material.

A method for manufacturing a thermal sensor includes anodizing either an outer surface of an inner electrode or an inner surface of an outer electrode to create a support layer thereon, coating a support layer using a molten state changing material, coaxially disposing the inner and outer electrodes, and sealing the support layer and the state change material at an end of the inner and outer electrodes.

Coating can include dip coating the support layer in a molten salt or aqueous salt solution or filling a space between the inner and outer electrodes with molten salt. Sealing the support layer can include disposing a sealant on an exposed edge of the support layer.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
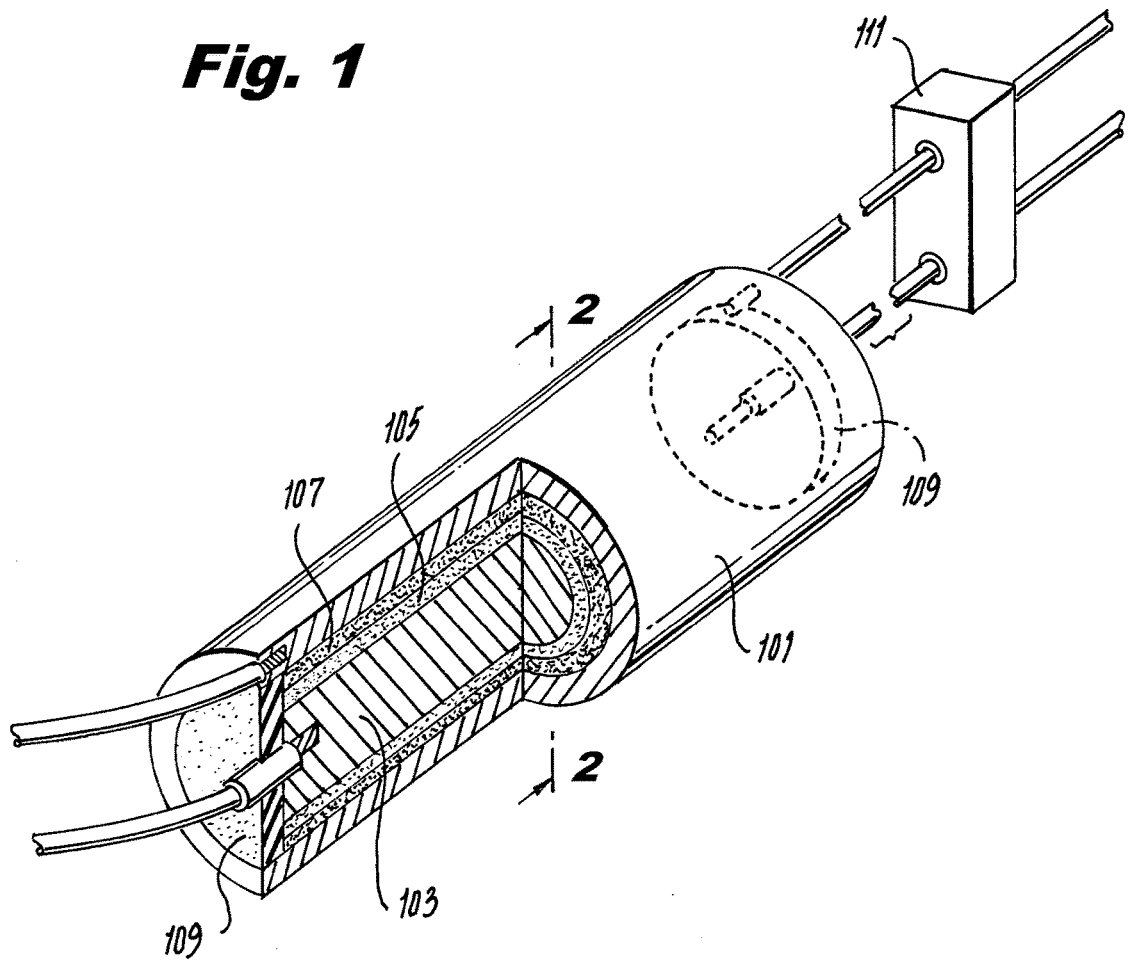
FIG. 1 is a perspective, partial cross-sectional view of an embodiment of a thermal sensor in accordance with this disclosure, showing the thermal sensor electrically connected to a signal processing device.
Figure 2:
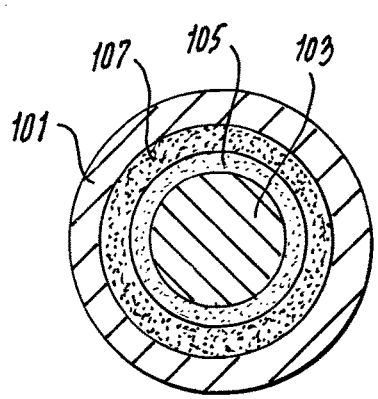
FIG. 2 is a cross-sectional view of the embodiment of a thermal sensor of FIG. 1.
Figure 3:
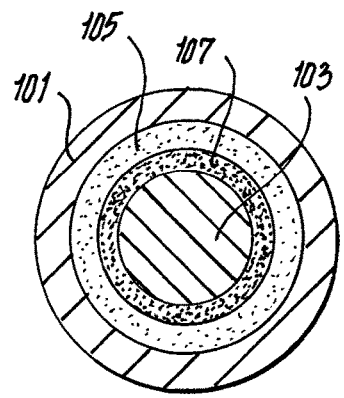
FIG. 3 is a cross-sectional view of another embodiment of a thermal sensor in accordance with this disclosure.

Reference will now be made to the drawings wherein like reference numerals identify similar structural features or aspects of the subject disclosure. For purposes of explanation and illustration, and not limitation, a perspective view an embodiment of the thermal sensor in accordance with the disclosure is shown in FIGS. 1-3, and is designated generally by reference character 100. The systems and methods described herein can be used to sense a temperature or indicate a threshold temperature, e.g., in an aircraft component and/or system.

A thermal sensor 100 includes an outer electrode 101, an inner electrode 103, and a support layer 105 disposed between the outer electrode 101 and the inner electrode 103. A state changing material 107 can be disposed on and/or within the support layer 105 such that the state changing material 107 is configured to transition between a non-conductive state to a conductive state at a threshold temperature to allow conduction between the outer electrode 101 and the inner electrode 103 above the threshold temperature.

As shown, one or both of the outer and inner electrodes 101, 103 can be cylindrical electrodes and can also be coaxial electrodes. It is contemplated that the inner and outer electrodes 101, 103 can be manufactured to any other suitable shape. The outer and inner electrodes 101, 103 can also be made of aluminum or any other suitable material.

As shown, the support layer 105 can be an anodized layer formed on one or both of the outer and inner electrodes 101, 103 (e.g., anodized aluminum layer $Al_2O_3$) or any other suitable oxidized layer. The anodized layer can be formed on an outer surface of the inner electrode 103 (e.g., as shown in FIGS. 1 and 2), or on an inner surface of the outer electrode 101 (e.g., as shown in FIG. 3), or both.

In such embodiments, the anodized layer characteristics can be selected to achieve a desired impedance and/or resistance of the sensor 100 when energy is applied to the sensor. For example, the morphology, thickness, porosity, or other properties can be modified to change the electrical and physical characteristics of the sensor 100. In some embodiments, the thickness of the support layer 105 is about 25 micrometers (about 0.001 inches).

In some embodiments, the support layer 105 could include a granular ceramic, glass or a granular high temperature polymer. The form of the granular ceramic or polymer may exist as a mesh, fibers, or membrane structure. A suitable polymeric material includes high temperature polytetrafluoroethylene (PTFE), and suitable ceramic materials include non-conducting metal oxides such as alumina, and glass. In other embodiments, the support layer 105 can include any other suitable porous material.

The state changing material 107 can be deposited so that the state changing material 107 is in partial contact with an anodized and non-anodized electrode surface. In some embodiments, upon reaching the critical sensor temperature, the state changing material 107 converts from a solid to a liquid and completes an electrical connection which results in a sensor output.

The state changing material can include a eutectic salt, a salt mixture, a conducting polymer film, and/or any other suitable phase/state changing material. The salt can include, for example, any suitable chemical mixture of nitrate salts having lithium, sodium and potassium cations and a lesser amount of nitrite salt that may contain one or more cations that include lithium, sodium and potassium. The desired amount of nitrite species ranges from about 1% by weight to about 15% by weight.

In some embodiments, the salt mixture can include a chemical ratio of $LiNO_3$:$NaNO_3$:$KNO_3$:$NaNO_2$. In some embodiments, salt compositions can include any suitable compositions, e.g., $CsNO_3$, $Ca(NO_3)_2$, NaCl, $ZnSO_4$, KI, $SnCL_2$, $NH_4Cl$, and/or MgCl. The state changing material 107 (e.g., a salt mixture, a eutectic salt mixture) can be selected to provide a melting temperature at a desired threshold temperature (e.g., about 99.5 degrees Celcius for the above ratio).

In some embodiments, the support layer 105 can further include one of a porous ceramic or a high temperature polymer with induced porosity, as for example a polymer foam or membrane. In embodiments using porous ceramic, the porous ceramic can include glass fiber or any other suitable porous ceramic in membrane form. In embodiments using a high temperature polymer, the high temperature polymer can include polytetrafluoroethylene (PTFE), polyetheretherketone (PEEK), polyetherimide (PEI), polyphenylsulfone (PPSU), and/or polysulfone (PSU), and/or any other suitable high temperature polymer.

As shown, the state changing material 107 can be sandwiched between the outer electrode 101 and the inner electrode 103 and/or the support layer 105. The layers can be sealed in between the outer electrode 101 and the inner electrode 103 by a sealant 109 at one or both ends of sensor 100. The sealant 109 can include a perfluoro-elastomer or any other suitable high temperature sealant that has a melting temperature above the state change material.

The sensor 100 can be electrically connected to a signal processing system 111 configured to determine an impedance, resistance, voltage, current, or other electrical characteristic of the sensor 100. As shown, the outer electrode 101 and the inner electrode 103 can be electrically connected to the signal processing system 111 in any suitable means. The signal processing system 111 can include any suitable circuitry hardware, software, and/or the like for receiving and/or processing electrical signals.

As described above, the sensor 100 can be used to determine temperature (e.g., through impedance measurements or other suitable electrical analysis) and/or that a temperature threshold has been exceeded because below a threshold temperature, the support layer 105 acts as the electrical insulator between the state change material 107 and one or both the electrodes such that an electrical signal is prevented from passing therethrough. When the threshold temperature is reached or exceeded, the state change material 107 melts and closes the circuit between the outer electrode 101 and the inner electrode 103 by entering into the support layer 105 (or melting within the support layer 105 if the state change material 107 is already present in the support layer 105). Signal processing system 111 can determine when this occurs and signal a suitable system (e.g., an on-board computer) or any other suitable indicator to indicate that a temperature where the sensor 100 is located exceeds the threshold temperature.

Due to the use of lighter electrode material and/or an anodized layer as opposed to conventional ceramic barriers, the sensor 100 can be thinner and lighter than conventional sensors. Also, the sensor 100 can be mounted to (e.g., via high temperature bonding) or positioned in an aircraft system (e.g. a duct) e.g., in near a hot air duct wall, thereby reducing the response time of the sensor 100. Since many sensors of this nature are used in a traditional commercial aircraft, it is envisioned that using a sensor 100 as disclosed herein can reduce the weight of an aircraft on the order of tens of pounds for example. In addition due to the aluminum, aluminum anodized support layer and the optionally polymeric support layer materials of construction used, the disclosed sensor design has higher geometric flexibility, allowing to be conformed to the shape of the duct-run without risk of cracking or damaging the support layer that renders the sensor inoperable.

In at least one aspect of this present disclosure, a method for manufacturing a thermal sensor 100 includes anodizing either an outer surface of an inner electrode 103 or an inner surface of an outer electrode 101 to create a support layer 105 thereon, coating a support layer 105 using a molten state changing material 107, coaxially disposing the inner and outer electrodes 103, 101, and sealing the support layer 105 and the state change material 107 at an end of the inner and outer electrodes 103, 101.

Coating can include dip coating the support layer 105 in a molten or aqueous salt mixture or filling a space between the inner and outer electrodes 103, 101 with molten or aqueous salt mixture or impregnating the support layer 105 with the molten or aqueous salt mixture. Sealing the support layer 105 can include disposing a sealant 109 on an exposed edge of the support layer 105 (or any other suitable portion of the sensor 100).

The methods, devices, and systems of the present disclosure, as described above and shown in the drawings, provide for a thermal sensor with superior properties including lighter weight and faster response time. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A continuous thermal/overheat sensor for an aircraft, comprising:
   an outer electrode;
   an inner electrode;
   a support layer disposed between the outer electrode and the inner electrode; and
   a state changing material disposed in contact with the support layer, wherein the state changing material is configured to transition between an electrically non-conductive state to an electrically conductive state at a threshold temperature of an aircraft component or aircraft system to electrically connect the outer and inner electrodes, wherein the support layer is an anodized layer on at least one of an inner surface of the outer electrode or an outer surface of the inner electrode.

2. The thermal sensor of claim 1, wherein at least one of the outer and inner electrodes are coaxial electrodes.

3. The thermal sensor of claim 1, wherein the outer and inner electrodes are made of aluminum.

4. The thermal sensor of claim 1, wherein the support layer can include at least one of a porous ceramic or a porous high temperature polymer.

5. The thermal sensor of claim 4, wherein the porous ceramic includes glass fiber or the high temperature polymer includes at least one of polytetrafluoroethylene (PTFE), polyetheretherketone (PEEK), polyetherimide (PEI), polyphenylsulfone (PPSU), or polysulfone (PSU).

6. The thermal sensor of claim 1, wherein the state changing material includes a salt mixture.

7. The thermal sensor of claim 6, wherein the salt mixture includes a chemical ratio of $LiNO_3:NaNO_3:KNO_3:NaNO_2$.

8. The thermal sensor of claim 1, wherein the state changing material is sandwiched between the outer electrode and the inner electrode, and wherein the state changing material is sealed in between the outer electrode and the inner electrode by a sealant.

9. The thermal sensor of claim 8, wherein the sealant includes a perfluoroelastomer.

10. A method for manufacturing a continuous thermal/overheat sensor, comprising:
    anodizing either an outer surface of an inner electrode or an inner surface of an outer electrode to create a support layer thereon;
    coating a support layer using a molten state changing material;
    coaxially disposing the inner and outer electrodes; and
    sealing the support layer and the state change material at an end of the inner and outer electrodes, wherein sealing the support layer includes disposing a sealant on an exposed edge of the support layer.

11. The method of claim 10, wherein coating includes dip coating the support layer in a molten or aqueous salt mixture or filling a space between the inner and outer electrodes with molten or aqueous salt mixture.

* * * * *